Feb. 18, 1969 W. A. MUNROE ETAL 3,427,874
INCLINE DYNAMOMETER
Filed Jan. 10, 1967 Sheet 1 of 2
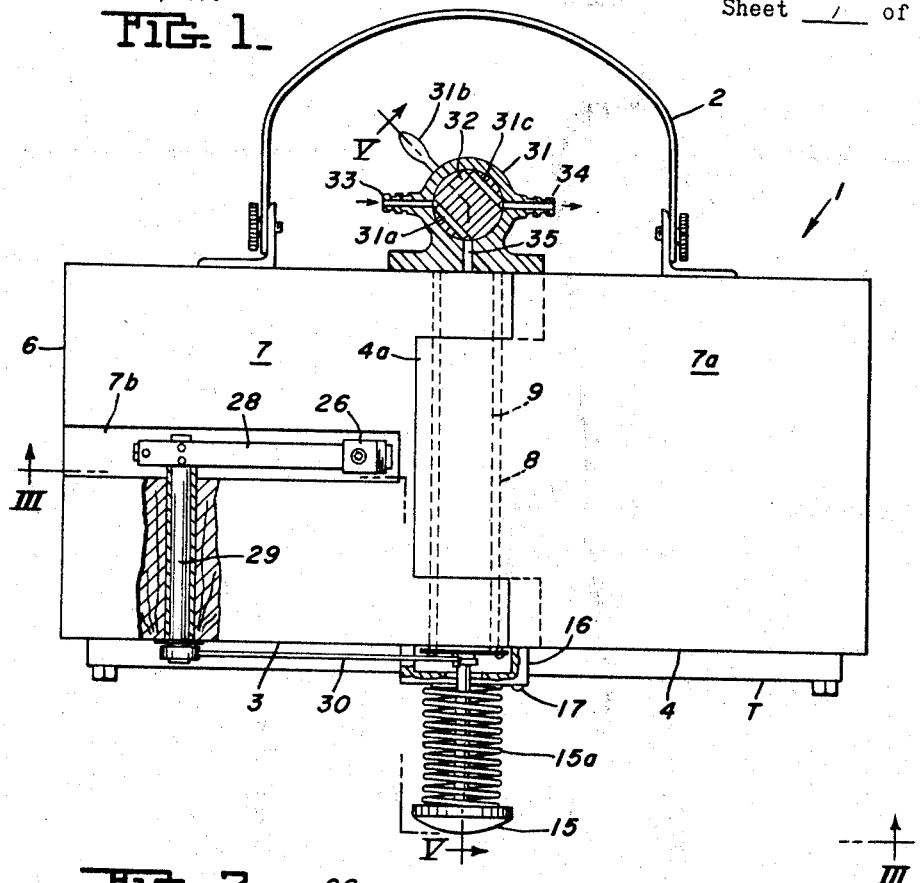
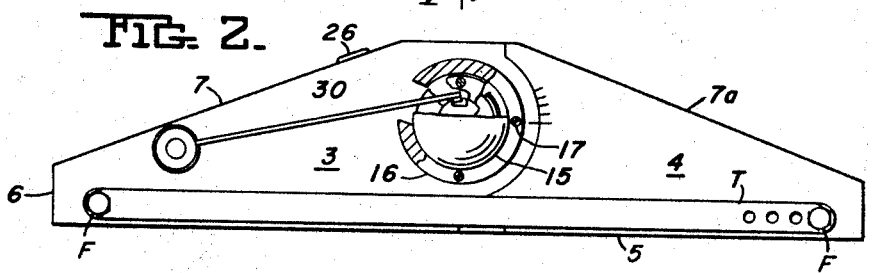
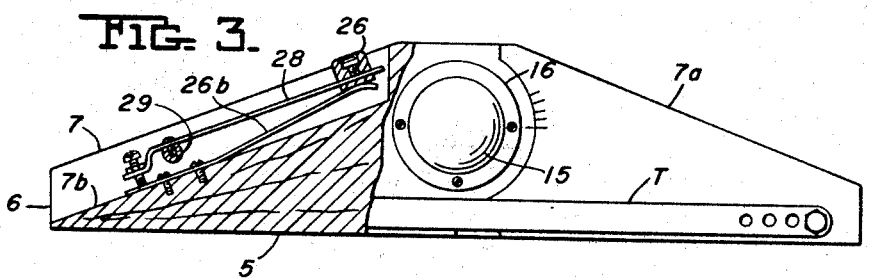
INVENTORS
WILLIAM A. MUNROE &
FREDERICK B. KRUGER
By
Christy, Parmelee & Strickland
Attorneys Feb. 18, 1969 W. A. MUNROE ET AL 3,427,874
INCLINE DYNAMOMETER
Filed Jan. 10, 1967 Sheet 2 of 2
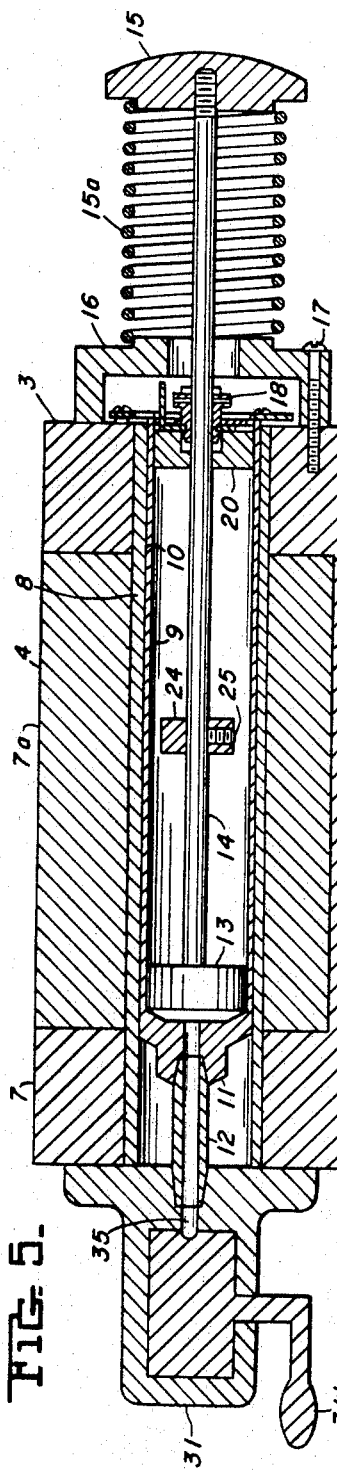
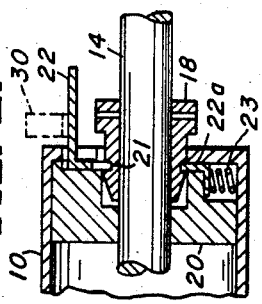
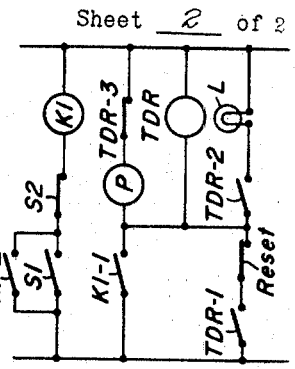
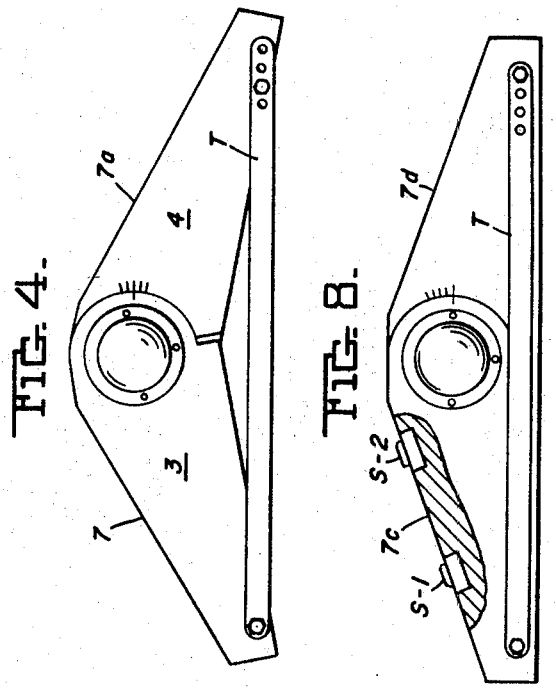
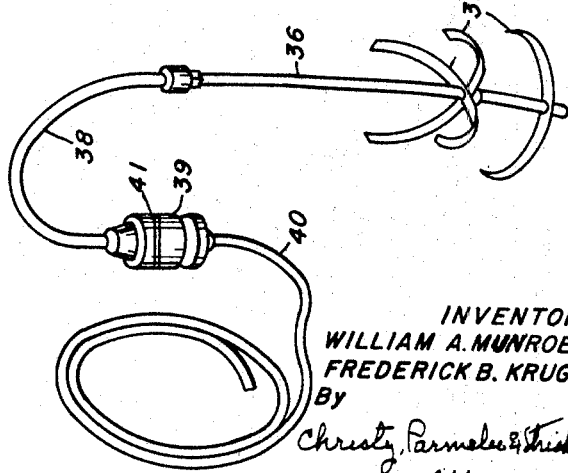
INVENTORS.
WILLIAM A. MUNROE &
FREDERICK B. KRUGER
By
Christy, Parmelee & Strickler
Attorneys United States Patent Office 3,427,874
Patented Feb. 18, 1969

3,427,874
INCLINE DYNAMOMETER
William A. Munroe, New Brunswick, N.J., and Frederick B. Kruger, Pittsburgh, Pa., assignors to Bacharach Industrial Instrument Co., Pittsburgh, Pa., a corporation of Pennsylvania
Filed Jan. 10, 1967, Ser. No. 613,382
U.S. Cl. 73—116                                 5 Claims
Int. Cl. G01m 15/00

The invention is directed to portable means and a method, for simulating on a relatively level section of a roadway, a desired load condition and the collecting of a sample of the exhaust gases from the internal combustion engine moving a loaded vehicle under said simulated load conditions.

One object of the invention is to obtain a sample of the vehicle engine exhaust gases under pre-selected simulated load conditions for a determination of the amounts of suspended solid materials and/or smog forming gas and vapors, and toxic gases including carbon monoxide contained therein. Such information is of value in combating air pollution, particularly in metropolitan areas of the nation.

Another object of the invention is to provide a readily portable means for both load simulation and exhaust gas sampling, which may be readily employed directly upon the highway at any convenient or desired location by relatively unskilled personnel.

A further object of the invention is to provide automatic means for obtaining such engine exhaust sample, which means is actuated by the vehicle in moving over a pre-selected distance under pre-selected loading conditions.

It is well known in the art of gas analysis, that exhaust gas samples taken from an idling internal combustion engine are wholly inadequate to determine the amounts of smoke, smog, forming gases, etc., which may be emitted when such engine is under load. Heretofore such samples, under simulated pre-selected load conditions, were obtainable only by mounting the vehicle upon a loading device known as a chassis dynamometer. Such a testing machine, by reason of its weight and bulk must be permanently installed in a fixed location and the vehicle moved to such location. Such testing procedure is time consuming and necessitates the vehicle leaving the highway.

These and other objects of the invention will be made apparent from the following description and the drawing forming a part thereof wherein:

FIG. 1 shows a plan view of one form of an adjustable ramp, partly in section and embodying mechanical means for obtaining a sample of exhaust gases from a vehicle moving thereover.

FIG. 2 shows a side elevation of the ramp of FIG. 1, partly in section to illustrate the mechanical means for actuating the gas sampling means:

FIG. 3 shows a side elevation of the ramp of FIG. 1, partly in section, taken on lines III—III of FIG. 1;

FIG. 4 shows one form of means for adjusting the ramp of FIG. 1 to vary the load on the engine of a vehicle moving thereover;

FIG. 5 shows a cross section of the ramp of FIG. 1 taken on lines V—V illustrating the gas sample pump and means for operating same;

FIG. 6 shows an enlarged view of the latching means of the gas sample collecting pump;

FIG. 7 shows one form of suitable means for connecting the exhaust gas sample collecting means of FIGS. 1 and 6 to an engine exhaust gas outlet;

FIG. 8 shows a ramp, similar to FIG. 1, having spaced contact means for electrically actuating a mechanical means for obtaining an exhaust gas sample;

FIG. 9 shows one form of suitable electrical circuit for actuating an automatic means for obtaining a sample of engine exhaust gas as the vehicle rolls over the ramp of FIG. 8.

Referring now in detail to FIGS. 1 to 6 of the drawings, the portable ramp, indicated generally as 1, may be of wood or any suitable light weight metal. For purposes of illustration and not limitation, the ramp may be two or three feet in length and one to two feet wide. Suitably attached at one side of the ramp may be any suitable form of carrying handle 2. The ramp may be in a single piece, but preferably is made in two pieces for adjustment to change the angle of inclination of the top faces thereof to vary the loading of the internal combustion engine in moving a rear wheel of a loaded vehicle body thereover. Additional loading of the said engine may be obtained by mounting one of said ramps in front of both rear wheels or in certain cases the front wheels of the vehicle may be used.

As shown in FIGS. 1 to 4 inclusive, the ramp may be made in two sections 3 and 4. Each section 3 and 4 has a base portion 5, a leading edge 6 and inclined wheel bearing faces 7 and 7a. The sections 3 and 4 have suitably aligned transverse openings 8 therethrough to receive a pivot sleeve 9 connecting the sections together. It will be noted at FIG. 1 the ramp section 3 has an offset therein receiving the tongue portion 4a of the ramp section 4, providing the pivotal connection between ramp sections 3 and 4 about the pivot sleeve 9.

As best shown in FIG. 5, which is a section taken on lines V—V of FIG. 1, the pivot sleeve 9 receives an exhaust gas sampling pump cylinder 10 having a head portion 11 thereon with a hollow extension 12. Within cylinder 10 is a piston 13 mounted upon a piston rod 14 extending rearwardly therefrom through the opposite end of cylinder 10 where the rod terminates in a handle portion 15 which is normally biased in retracted position by coil spring 15a. Mounted on a side face of ramp section 3 is a housing member 16, enclosing rod 14, and secured to the ramp section 3 by suitable fasteners 17 forming a bearing surface for spring 15a. Within the adjacent end of cylinder 10 is mounted a latch housing member 20, as best shown in FIG. 6, through which the rod 14 slidably extends. A guide and latching bushing 18 is mounted in fixed relation upon rod 14, and is recessed into latch housing 20. A peripheral recess 21 in bushing 18 slidably receives a latch member 22 which is biased by a spring 23 within housing 20 to normally retain latch portion 22a engaged with bushing 18. Rod 14 has slidably mounted thereon a collar member 24 adjustably held in place thereon by set-screw 25. Collar member 24 measures the stroke of piston 13 to control the volume of gas sample for testing as hereinafter discussed.

Referring again to FIGS. 1, 2, 3 and 5, ramp surface 7 has a longitudinal recess 7b in the face thereof. Extending transversely of the ramp and connecting recess 7b with an outer longitudinal edge of the ramp is a suitable aperture receiving a rotatable shaft 29. The inner end of shaft 29 is fixed to trigger arm 28 and the outer end of shaft 29 is fixed to one end of latch arm 30 extending longitudinally of the ramp. The opposite end of arm 30 overlies the spring biased latch member 22 (FIG. 6). Trigger arm 28 has at one end a longitudinally adjustable button 26 which is normally held in vehicle tire engaging position by spring 26b. A vehicle wheel rolling upwardly over the middle of the upper face 7 (FIG. 1) of the ramp engages and depresses trigger button 26 attached to trigger arm 28 and causes depression of arm 28. Arm 28 being attached to shaft 29 causes rotation thereof, and of latch release arm 30 (FIG. 1). The rotating outer end of arm 30 engages and depresses portion 22 (FIG. 6) of the latch, moving latch portion 22a out of engagement with pump piston rod guide bushing 18. The compressed spring 15a then moves handle 15 to the right carrying piston 13 with it causing a sample of exhaust gas to be drawn through valve housing 31 into cylinder 10.

Upon reference to FIGS. 1 and 5, it will be observed that cylinder 10 has an extension 12 connecting with port 31a of valve body 32. Port 31a, as shown in FIG. 1 communicates with an inlet 33 which may be connected with any suitable means to draw the vehicle engine exhaust gases through inlet 33 and port 31a into the pump cylinder 10 while member 24 on piston rod 14 moves into engagement with member 20. Valve handle 31b may then be rotated, as viewed in FIG. 1, until port 31c connects exhaust outlet 34 to valve inlet port 35. At this point pump handle 15 may be again depressed to force the exhaust gases in pump cylinder 10 out through outlet 34 into a suitable collection means either for immediate analysis or for transfer to a laboratory for a later analysis for smog forming or toxic contents.

Referring now to FIG. 7, wherein is disclosed one known form of means for conveying the vehicle internal combustion engine exhaust gases to valve 31 (FIG. 1), a suitable hollow probe 36 has at one end thereof a plurality of suitable flexible members 37 which may be inserted into the open end of the vehicle engine exhaust outlet to retain the probe 36 therein. The opposite end of probe 36 has connected thereto one end of a suitable hollow conduit 38 whose opposite end is connected to a head member 39 having a longitudinally opening extending therethrough. One end of said opening is connected to conduit 38 and the opposite end of said member 39 opening is connected to one end of a section of flexible tubing 40. The member 39 may be provided with a slotted opening 41 extending across the said longitudinal opening therein. A suitable filter paper may be inserted into slot 41 and across the longitudinal opening in member 39 to screen out suspended solids in the exhaust gases. The means 36 through 41 is a conventional and known means for samplig exhaust gases for determination of suspended solids therein normally connected with a pump, such as 10 (FIG. 5). The gas sample thus collected may then be subjected to subsequent analysis, for smog forming or toxic contents.

Referring now to the drawings, FIGS. 1 through 7, the device herein described may be used at any suitable location where the vehicle to be tested moves over a highway. The ramp 1, as shown, in FIGS. 1 and 2, is positioned in front of a wheel, usually a rear wheel, of the stopped vehicle with the portion 6 of the ramp (FIG. 2) abutting the tire of said wheel. One end of probe 36 and the members 37 thereon are inserted into the outlet opening of the vehicle engine exhaust pipe. The free end of the flexible tubing 40 is connected to the inlet 33 at the left hand end of FIG. 1. The vehicle driver is then instructed to shift into an appropriate gear ratio to move the vehicle over the ramp. Then handle 15 of the pump is pushed inwardly to compress spring 15a and engage member 18 with the latch bar 22, FIGS. 5 and 6. The driver is then instructed to drive the vehicle over the ramp faces 7 and 7a. As the vehicle tire rolls upon the ramp and engages the button 26, FIGS. 2, 3 and 6, the arm 26 is depressed to rotate shaft 29 and arm 30 to depress latch bar 22 and releases the pump piston rod and member 18 to move outwardly, under impetus from expanding spring 15a, to draw a sample of engine exhaust gases into probe 36 and through member 39 and tubing 40 into valve inlet and pump body 10. The vehicle wheel after passing over button 26 moves over the ramp and onto the highway, where it is stopped. The test operator then turns valve handle 31b to disconnect valve port 31a from the pump inlet 35 and to connect inlet 35 with valve outlet 34. Thereafter the operator again depresses pump handle 15 to force the exhaust gas sample in the pump out through outlet 34 into a suitable container, which may be either analyzed at once or sealed and later sent to a laboratory for analysis for toxic gases including carbon monoxide. A filter paper having been previously inserted in opening 41 of samplig head 39 may be removed after the test and the color gradation of the spot resulting from the deposited carbon thereon compared with a suitable means to determine the amounts of deposited solids, or in other words the smoke density of the vehicle exhaust gases under the test conditions.

Referring now to FIGS. 8 and 9, the adjustable ramp of FIG. 8 is similar to that of FIG. 1 except that the trigger arm 28 and latch release arm 30 are omitted. Thus the ramp of FIG. 8 has a planar face 7c and 7d over which the vehicle wheel moves and two depressible tire contact buttons S-1 and S-2 are mounted on ramp surface 7c. These buttons S-1 and S-2 are in electrical circuit with an electrically driven displacement type pump P for collecting a measured sample of engine exhaust gases during the interval as the pump P is energized upon depression of button S-1 and de-energized upon depression of button S-2. Any conventional form of alternating current supply may be employed to actuate a conventional synchronous motor driven positive displacement pump to draw the required exhaust gas sample as the vehicle tire successively depresses buttons S-1 and S-2. A suitable means for connecting the pump P of FIG. 9 to the engine exhaust outlet is shown in FIG. 7 of the drawing.

FIG. 9 of the drawing illustrates one suitable form of electrical circuit for actuating a pump for collection of a gas sample as the vehicle wheel rolls over button switches S-1 and S-2. This circuit illustrates all relay contacts in de-energized state and all other switches S-1, S-2 and the reset in normal position. When button switch S-1 is closed by the vehicle tire depressing said button switch in starting to traverse the ramp face 7c, relay K1 will be energized thereby closing its contacts K1-1 and K1-2. Contact K1-2 when closed latches relay K1 to hold it energized. Contact K1-1 when closed will effect operation of gas sampling pump P and start the timing movement of time delay relay TDR of any conventional form. If sufficient time elapses to permit the taking of an adequate gas sample, before the vehicle tire moving over the ramp depresses button switch S-2 to open it, the timer TDR will have run out and thereby actuates contacts TDR 1-2 & 3. When this occurs, the motor of pump P will stop, due to opening of contact TDR3. At the same time TDR1-2 being closed, the lamp L is energized giving a visual signal that a sufficient and correct sample volume of engine exhaust gases has been drawn by pump P for accurate smoke density measurement which may then be passed to a suitable container. Lamp L will remain lighted through the TDR latching contacts TDR-1-2 and will remain so until the Reset switch is opened, even though the opening of S-2 by the vehicle rolling thereover will de-energize K-1, returning all K-1 contacts to their de-energized positions.

However, should the vehicle tire traverse the ramp between ramp button switches S-1 and S-2 before the timer TDR will have run out, the opening of S-2 will de-energize contact K1 thereby opening contacts K1-1 and K1-2 to interrupt power to the pump motor and cause the TDR to reset to its zero position. By reason of S-2 being opened before timer TDR has completed its cycle, the circuit will have been opened before lamp L is lighted, thereby indicating to the test operator that an insufficient sample was obtained, necessitating repeating the test.

Having disclosed a presently preferred form of the invention, it will be apparent to those skilled in the art that modifications in the shape of the ramp and the means for collecting gas samples may be made without departing from the invention as defined within the scope of the appended claims. The shape and slope of the ramp faces may be varied as required.

As best shown in FIGS. 1 and 4, the ramp may be provided in one piece with fixed slopes over which the vehicle moves, or in two pieces adjustable for varying the slope of the ramp faces. One suitable means for varying the slope of the ramp faces is a tie-bar T having a plurality of openings adjacent one end thereof and a single opening adjacent the opposite end for engagement by suitable fastening means F for attachment to the ramp segments. An alternate form would be a bar having a turn-buckle intermediate its ends.

Suitable scale markings on the ramp sections, as shown, permit setting and re-setting the ramp into and out of various inclined positions, as conditions require.

We claim:

1. Portable apparatus for use upon a road surface to simulate pre-determined loading conditions of an internal combustion engine moving the vehicle thereover for obtaining samples of the engine exhaust gases for determination of smoke density and other air-polluting gases and vapors therein, comprising
    (a) ramp means having a flat road surface engaging bottom face and an upwardly inclined top face over which a wheel of the vehicle is to be moved,
    (b) means, connected to the said ramp means for withdrawing a sample volume of the vehicle engine exhaust gases from the engine exhaust outlet as a vehicle wheel moves over the upwardly inclined face of the first named means, and
    (c) means on said first named means upwardly inclined face and engaged by the vehicle wheel moving thereover for actuating said second named means for obtaining an engine exhaust gas sample.

2. Apparatus as defined in claim 1, wherein the angle of inclination of the upwardly inclined face of said ramp relative to the road surface is selectively adjustable.

3. Apparatus as defined in claim 1, wherein the second named means comprises a pump, conduit means for connecting the engine exhaust outlet with said pump, valve means between said pump and said conduit means for selectively connecting the front end said pump with said conduit and with a suitable exhaust gas sample container, a piston within said pump for reciprocal movement towards and away from said valve means, a piston rod on said piston extending rearwardly through the pump and away from said valve means and terminating in an enlarged head portion at one side of said ramp means, latch means on said piston rod and on the adjacent face of said ramp means, a compression spring on said piston rod beneath said piston rod head and compressed when said piston rod latch means is engaged by said ramp latch means, and means on said inclined ramp face engaged by the vehicle wheel in moving thereover for releasing said latch means to draw a sample of exhaust gas into said pump as the compressing spring retracts said pump piston from adjacent said valve.

4. Apparatus as defined in claim 3, wherein said conduit means includes a suitable receptacle for receiving a removable porous member disposed transversely of the conduit means for filtering out solid matter in the exhaust gases moving through the conduit means and providing a smoke spot the coloration of which is a measurement of smoke density.

5. Portable apparatus as defined in claim 1, wherein said means associated with said ramp means for withdrawing a sample volume of vehicle engine exhaust gases comprises:
    (a) an electrically driven positive displacement pump,
    (b) a time delay relay means for controlling the sample volume of gases delivered by said pump,
    (c) means connecting said pump inlet with the exhaust outlet of a vehicle engine, and
    (d) an electrical circuit connecting said pump, said relay and the spaced switch means on said ramp means for drawing a sample of exhaust gas as a vehicle wheel moves over the up-side of the ramp face.

References Cited

UNITED STATES PATENTS 1,729,732  10/1929  Wasson _____ 73—116
2,077,538  4/1937   Wait _____ 73—116

RICHARD C. QUEISSER, *Primary Examiner.*

JERRY W. MYRACLE, *Assistant Examiner.*

U.S. Cl. X.R.

73—23, 421.5